Patented July 1, 1941

2,247,919

UNITED STATES PATENT OFFICE 2,247,919

DITHIOCARBAMATES

Joy G. Lichty, Stow, Ohio, assignor to Wingfoot Corporation, Wilmington, Del., a corporation of Delaware No Drawing. Application November 16, 1940, Serial No. 365,939

5 Claims. (Cl. 260—455)

This invention relates to a new class of compounds the members of which are valuable either as such or with other substances, in the vulcanization of rubber. It relates, among other things, to a method of accelerating the processes of vulcanization by incorporating in the unvulcanized stock certain chemical compounds which not only are comparatively easy to prepare but also impart desirable physical properties to the vulcanized products. The compounds with which the invention deals are new in themselves and may be described as amino carbonyl alkyl esters of dithiocarbamic acids. This application is in part a continuation of application Serial No. 688,437, filed September 7, 1933, now matured into Patent No. 2,175,809, and application S. N. 752,123, filed November 8, 1934.

Illustrative of the compounds which the invention concerns is the type formula $$(D-S)_n-R-\overset{\overset{\displaystyle O}{\|}}{C}-X$$

wherein X is a radical containing nitrogen directly attached to the carbon of the carbonyl group, D is a thiocarbamyl group, $n$ is one or more and R is an alkyl group. Thus, X may be an amino group such as —$NH_2$, —NH-aryl, —NH-alkyl, —NH-aralkyl, N(dialkyl), —N(diaryl), —N(alkyl) (aryl), etc. In the formula given above, R represents any alkyl group. Where the fatty acid employed is acetic acid, R is methyl; similarly, where butyric acid, for instance, is employed, R is a propyl group. When the compounds are to be employed as accelerators of vulcanization, it will generally be found that it is preferable that the carbonyl group be separated from the dithiocarbamic radical by a single carbon atom. This may be accomplished by employing halogenated fatty acids in which the halogen is attached to the carbon atom alpha to the carbonyl group.

In the type formula, D is more specifically the group

In the latter group, $R_1$ and $R_2$ may be like or unlike radicals or, if desired, $R_1$ and $R_2$ may be taken together to form a cyclic alkylene chain. Also, either $R_1$ or $R_2$, but not both, may be hydrogen.

In general, these compounds are prepared simply by bringing together solutions of a dithiocarbamate and a halogen-substituted fatty acid amide. In certain cases, a compound forms at once; in others, it may be necessary to allow the mixture of the solutions to stand for a few hours or to heat the mixture slightly. In any case, the product forms as a solid or oil which may be easily separated and purified. The reaction is found to proceed with substantially equal facility with either a mono or di-halogenated fatty amide.

Illustrative of the preparation of these compounds is that of anilino carbonyl methyl di-(penta methylene dithiocarbamate). This compound may be prepared by refluxing for a period of 30 minutes a solution of 20.4 grams of dichloro acetanilid and 50 grams of piperidinium penta methylene dithiocarbamate. A precipitate is formed which, together with the solvent, is poured into approximately 1½ liters of water. The solid, anilino carbonyl methyl dithiocarbamate, upon being filtered, washed and dried, is obtained in a yield of 95%. When further purified by recrystallization from xylene or from a mixture of alcohol and chloroform, it melts with decomposition at 177° C. The equation representing the reaction is as follows:

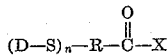

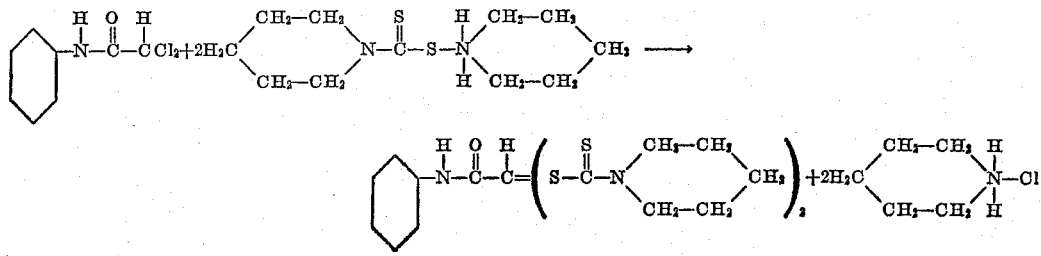

In the preparation of carbamyl methyl dimethyl dithiocarbamate, an equimolecular mixture of ammonium chloride and mono chloro acetamide in 175 cc. of warm water is added, meanwhile stirring, to 0.4 mol of an aqueous solution of sodium dimethyl dithiocarbamate. The mixture is heated to 45° C., whereupon a solid separates out. The mixture is then cooled to 25° C. and the solid filtered off. Upon washing and drying, 38.7 grams of carbamyl methyl dimethyl dithiocarbamate melting at 122° C. are obtained. By partial evaporation of the filtrate under reduced pressure, an additional yield of 13 grams of product is obtained. This additional material when recrystallized from alcohol melts at 125° C.

Other compounds of similar nature are carbamyl methyl penta methylene dithiocarbamate, melting at 144–145° C., and anilino carbonyl methyl pentamethylene dithiocarbamate, melting at 121° C. Still others are ethyl amino carbonyl methyl diethyl dithiocarbamate, amyl amino carbonyl methyl di isoamyl dithiocarbamate, butyl amino carbonyl methyl dibutyl dithiocarbamate, naphthyl amino carbonyl methyl di cyclohexyl dithiocarbamate, benzyl amino carbonyl methyl di(beta phenyl ethylene) dithiocarbamate, morpholyl amino carbonyl methyl ethyl benzyl dithiocarbamate, xylyl amino carbonyl methyl di(hexahydro tolyl) dithiocarbamate, penta methylene amino carbonyl methyl N-methyl tetrahydro alpha furfuryl dithiocarbamate, dimethyl amino carbonyl methyl ethyl dithiocarbamate, and the like.

Dithiocarbamates derived from other amines may be employed in the practice of the invention, examples being those derived from dibutyl amine, methyl cyclohexyl amine, methyl aniline, dibenzyl amine, ditetrahydro furfuryl amine, ethyl cyclohexyl amine, methyl naphthylamine, diamyl amine and the like. Other acetamides which may be reacted with a solution of any dithiocarbamate are the mono- and di-chlor and brom derivatives of acet diphenyl amine, nitro acet anilide, acet toluide, acet phenyl naphthyl amide, acet dibutyl amine, acet dicyclohexyl amine, acet ethyl benzyl amine, acet methyl amide, and the like.

The compounds to which the invention relates may be employed as accelerators of vulcanization in substantially any of the standard rubber formulae, one found particularly satisfactory being the following:

|  | Parts by weight |
|---|---|
| Extracted pale crepe rubber | 100 |
| Zinc oxide | 5 |
| Sulfur | 3 |
| Stearic acid | 1.5 |
| Accelerator | 0.5 |

After vulcanization, physical tests on stocks so made up have been run with the following results:

| Cure time in mins., °F. | Tensile strength | Elongation | Stress kgs./cm.² at— | |
|---|---|---|---|---|
| | | | 500% | 700% |
| ANILINO CARBONYL METHYL DI(PENTA METHYLENE DITHIOCARBAMATE) | | | | |
| 20/260 | 35 | 975 | 6 | 10 |
| 30 | 114 | 920 | 12 | 30 |
| 40 | 135 | 850 | 17 | 54 |
| 60 | 180 | 790 | 28 | 107 |
| CARBAMYL METHYL PENTA METHYLENE DITHIOCARBAMATE, 0.50 PART—DIPHENYLGUANIDINE 0.20 PART | | | | |
| 40/285 | 56 | 870 | 10 | 23 |
| 60 | 78 | 850 | 12 | 32 |
| 80 | 90 | 840 | 13 | 40 |
| 120 | 102 | 820 | 15 | 47 |
| CARBAMYL METHYL DIMETHYL DITHIOCARBAMATE 0.50 PART—DIPHENYLGUANIDINE 0.20 PART | | | | |
| 40/285 | 46 | 900 | 8 | 17 |
| 60 | 70 | 870 | 11 | 30 |
| 80 | 77 | 830 | 13 | 36 |

These compounds, new in themselves, possess valuable properties as accelerators of vulcanization. As is disclosed in the preceding data, they may be employed either by themselves or in conjunction with other basic organic nitrogen-containing accelerators, such as diphenylguanidine, diortho tolyl guanidine, diphenylguanidine oxalate, diphenylguanidine succinate, cyclohexyl ammonium fumarate and the like. It will be noted that, in general, the dihalogen acetamide derivatives of the dithiocarbamates are more powerful accelerators than the mono halogen derivatives. Consequently, with the dihalogen derivatives, activators will not usually be necessary, although they may be found desirable in certain instances. With the mono halogen derivatives, on the other hand, activators are in most cases desirable, although not invariably necessary.

It is intended that the patent shall cover, by suitable expression in the appended claims, all features of patentable novelty residing in the invention.

I claim:

1. The fatty acid amides in which only one hydrogen atom attached to a carbon atom alpha to the carbonyl group is replaced by the group —S—D, wherein D is a thio carbamyl radical.

2. The acetamides in which only one hydrogen atom of the methyl radical attached to the carbonyl group is replaced by the group —S—D, wherein D is a thio carbamyl radical.

3. Carbamyl methyl dimethyl dithiocarbamate.

4. Anilino carbonyl methyl di(penta methylene dithiocarbamate).

5. Carbamyl methyl penta methylene dithiocarbamate.

JOY G. LICHTY.